(12) United States Patent
Viswanathan et al.

(10) Patent No.: US 10,885,697 B1
(45) Date of Patent: Jan. 5, 2021

(54) SYSTEMS AND METHODS FOR GENERATING AUGMENTED-REALITY MAKEUP EFFECTS

(71) Applicant: Facebook, Inc., Menlo Park, CA (US)

(72) Inventors: Srinidhi Viswanathan, Mountain View, CA (US); Ian Erik Smith Heisters, El Cerrito, CA (US); Bruno Pereira Evangelista, Palo Alto, CA (US); Jennifer Dolson, Menlo Park, CA (US); Alexandra Louise Krakaris, Orinda, CA (US)

(73) Assignee: Facebook, Inc., Menlo Park, CA (US)

( * ) Notice: Subject to any disclaimer, the term of this patent is extended or adjusted under 35 U.S.C. 154(b) by 76 days.

(21) Appl. No.: 16/217,406

(22) Filed: Dec. 12, 2018

(51) Int. Cl.
| | |
|---|---|
| *G06T 15/04* | (2011.01) |
| *G06T 19/00* | (2011.01) |
| *G06T 7/44* | (2017.01) |
| *G06K 9/00* | (2006.01) |

(52) U.S. Cl.
CPC .......... *G06T 15/04* (2013.01); *G06K 9/00268* (2013.01); *G06T 7/44* (2017.01); *G06T 19/006* (2013.01)

(58) Field of Classification Search
CPC ........ G06T 15/04; G06T 7/44; G06T 19/006; G06T 11/60; G06T 7/97; G06T 11/001; G06T 7/40; G06T 7/90; G06T 2207/30201; G06K 9/00268; G06K 9/00221; G06K 9/00248; G06K 9/00281; G06K 9/00362; G06K 9/00597; G06K 9/0061

See application file for complete search history.

(56) References Cited

U.S. PATENT DOCUMENTS

| | | | |
|---|---|---|---|
| 2007/0086675 A1* | 4/2007 | Chinen | G06T 7/194 382/284 |
| 2014/0210814 A1* | 7/2014 | Kim | A45D 44/005 345/420 |
| 2016/0217557 A1* | 7/2016 | Abdollahian | G06T 5/005 |
| 2018/0268572 A1* | 9/2018 | Nishi | G06K 9/00268 |
| 2019/0122404 A1* | 4/2019 | Freeman | G06T 7/251 |
| 2019/0325616 A1* | 10/2019 | Chhaya | G06N 3/02 |

\* cited by examiner

*Primary Examiner* — Ke Xiao
*Assistant Examiner* — Andrew Shin
(74) *Attorney, Agent, or Firm* — Baker Botts L.L.P.

(57) ABSTRACT

One embodiment of the present disclosure presents a technique for generating an augmented reality effect. The technique includes receiving first input data including an image of a face. The technique further includes, based on the first input data, generating a first intermediate texture corresponding to an eyelid of the face with make-up. The technique further includes, based on the first input data, generating a second intermediate texture corresponding to the eyelid of the face without make-up. The technique also includes generating an output texture based on the first intermediate texture and the second intermediate texture. The technique further includes generating an effect by applying the output texture to second input data corresponding to a second image of a second face.

20 Claims, 13 Drawing Sheets
(7 of 13 Drawing Sheet(s) Filed in Color)

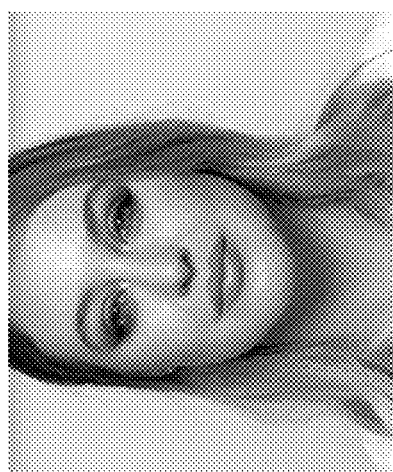
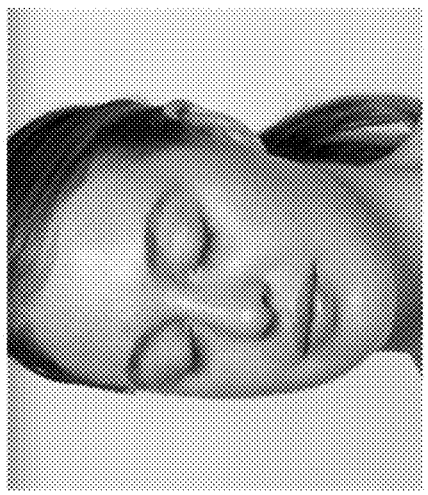
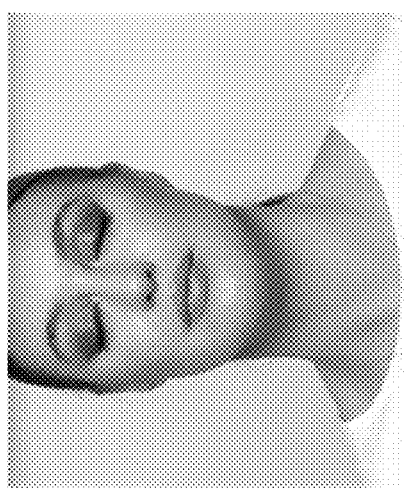
FIG. 2

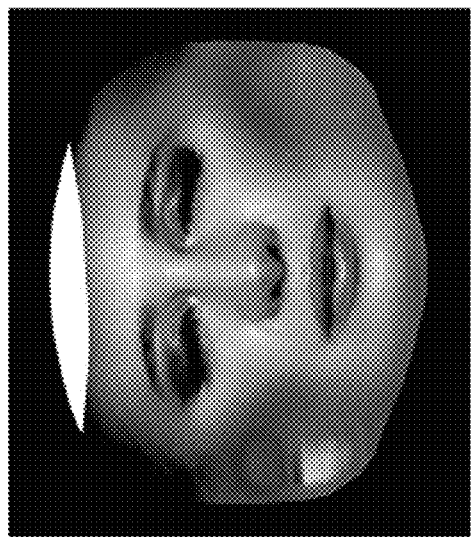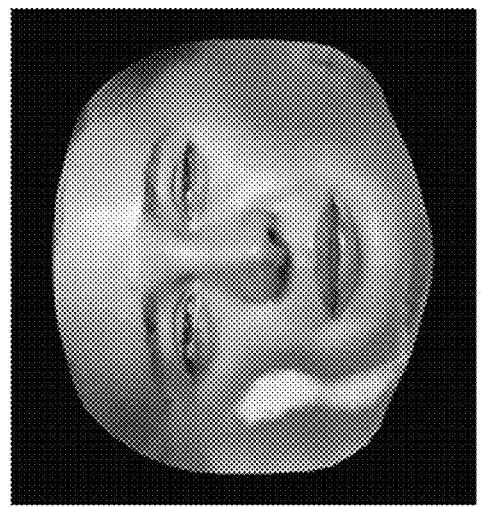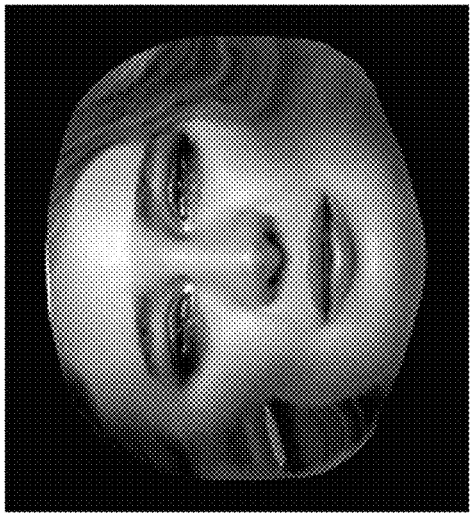
FIG. 3

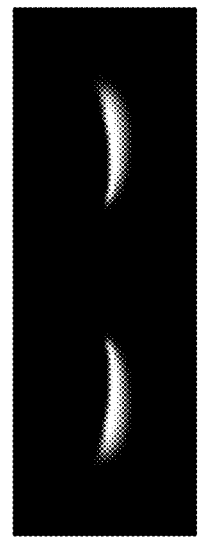
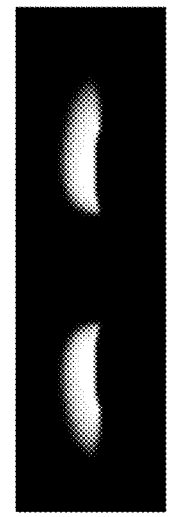
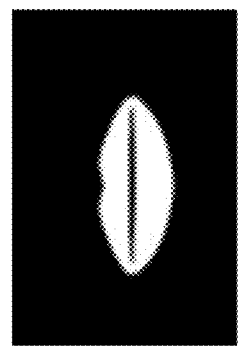
FIG. 4

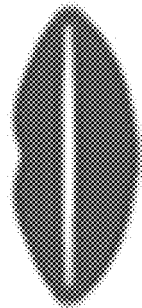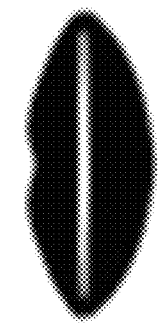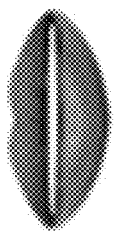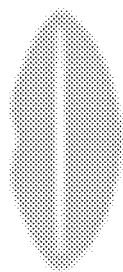
FIG. 5

SYSTEMS AND METHODS FOR GENERATING AUGMENTED-REALITY MAKEUP EFFECTS

TECHNICAL FIELD

This disclosure generally relates to augmented reality (AR), such as AR effects.

BACKGROUND

Artificial reality is an alteration of perception to produce an effect. Artificial reality may include virtual reality, mixed reality, augmented reality, and so forth. For example, in augmented reality (AR), one or more layers may be placed over a physical scene. The layers may add one or more elements to the scene, modify one or more elements of the scene, and/or remove one or more elements from the scene.

For example, an AR system may enable a user to create, modify, and/or remove one or more layers from an AR scene. In particular, the AR system may enable a user to add a background layer to the AR scene that may alter the perceived setting of the scene (e.g., adding rain clouds to a scene depicting a sunny day). In addition, the AR system may allow a user to modify and/or remove an AR effect from a scene. For example, the user may add a mask layer that obscures one or more rain clouds in the sunny-day scene. Additionally, or alternatively, the user may replace the blocked rain clouds with another layer (e.g., a layer corresponding to a neon red poster).

In addition, a user may implement the AR system to replicate a real-life effect in as an AR effect. To replicate the real-life effect, a user may manually define the effect in an AR system. In particular, the user may define shapes, colors, layers, textures, and so forth. One drawback of current techniques for generating AR effects is that manually generating an AR effect may be boring and tedious. In particular, there may be numerous shapes, color, layers, and textures that may be integrated to replicate the AR effect. In addition, replicating a real-life effect in an AR system may be difficult. In particular, the resulting effect may be not accurately reflecting a real-life subject, such as a make-up effect on a beauty influencer.

SUMMARY OF PARTICULAR EMBODIMENTS

This disclosure relates to a technique for generating an AR effects from an image of a real-life subject. In addition, the disclosure provides a technique for transferring the AR effects to images of other real-life subjects. In particular, an AR application may receive first input data. The first input data may correspond to one or more images that include an object (e.g., a real-life subject). The object may include one or more coatings and the object may be in one or more states. For example, the object may be a face. The face may include one or more coatings of cosmetic products. In addition, the face may be in a first state (e.g., eyes open) or in a second state (e.g., eyes closed). In various embodiments, the first input data includes multiple images of the object in each of the first state and the second state and with and without the one or more coatings.

The AR application may process the first input data to generate one or more intermediate textures. For example, the AR application may resize an image, white balance an image, perform histogram equalization on an image, and/or extract one or more textures from an image. In addition, the AR application may generate one or more binary masks that corresponds to an element of the object (e.g., a pair of upper eyelids of a face). The AR application may further multiply an extracted texture by a binary mask to produce an element-specific texture (e.g., a texture corresponding to an upper eyelid).

The AR application may implement one or more technique to produce an intermediate texture based on the element-specific texture. For example, the AR application may compute an average color value of pixels of the element-specific texture. Additionally, or alternatively, the AR application may sample a color value of one or more points of the element-specific texture and compute an average color value of the sampled points. Further, the AR application may use cloning to blend a first element-specific texture corresponding to the element in a first state (e.g., eyelids raised) and a second element specific texture corresponding to the element-specific texture in a second state (e.g., eyelids closed). The blended element-specific texture may be defined as the intermediate texture.

In various embodiments, the AR application generates one or more output textures. The output textures may correspond to a quotient map of an intermediate texture corresponding to an element with one or more coatings and an intermediate texture corresponding to the element without the one or more coatings. For example, an output texture may correspond to a quotient map of a lip texture with make-up and a lip texture without make-up. Similarly, an output texture may correspond to a quotient map of an eyelid texture with make-up and an eyelid texture without make-up. The AR application may transmit the output textures to a studio application. The studio application may receive second input data corresponding to an image of a second object (e.g., an image of a second face). The studio application may generate the AR effect on the second object by multiplying the output textures by the second object. For example, the studio application may multiply a color value of a pixel of the output texture by a color value of a corresponding pixel of the second object, as described in further detail below.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 2 illustrates an example first input data processed by the AR application, according to various embodiments.

FIG. 3 illustrates an example of texture extraction on first input data, according to various embodiments.

FIG. 4 illustrates one or more binary masks generated from texture extraction of an object, according to various embodiments.

FIG. 5 illustrates example output textures corresponding to one or more elements of an object, according to various embodiments.

DESCRIPTION OF EXAMPLE EMBODIMENTS

Figure 1A:
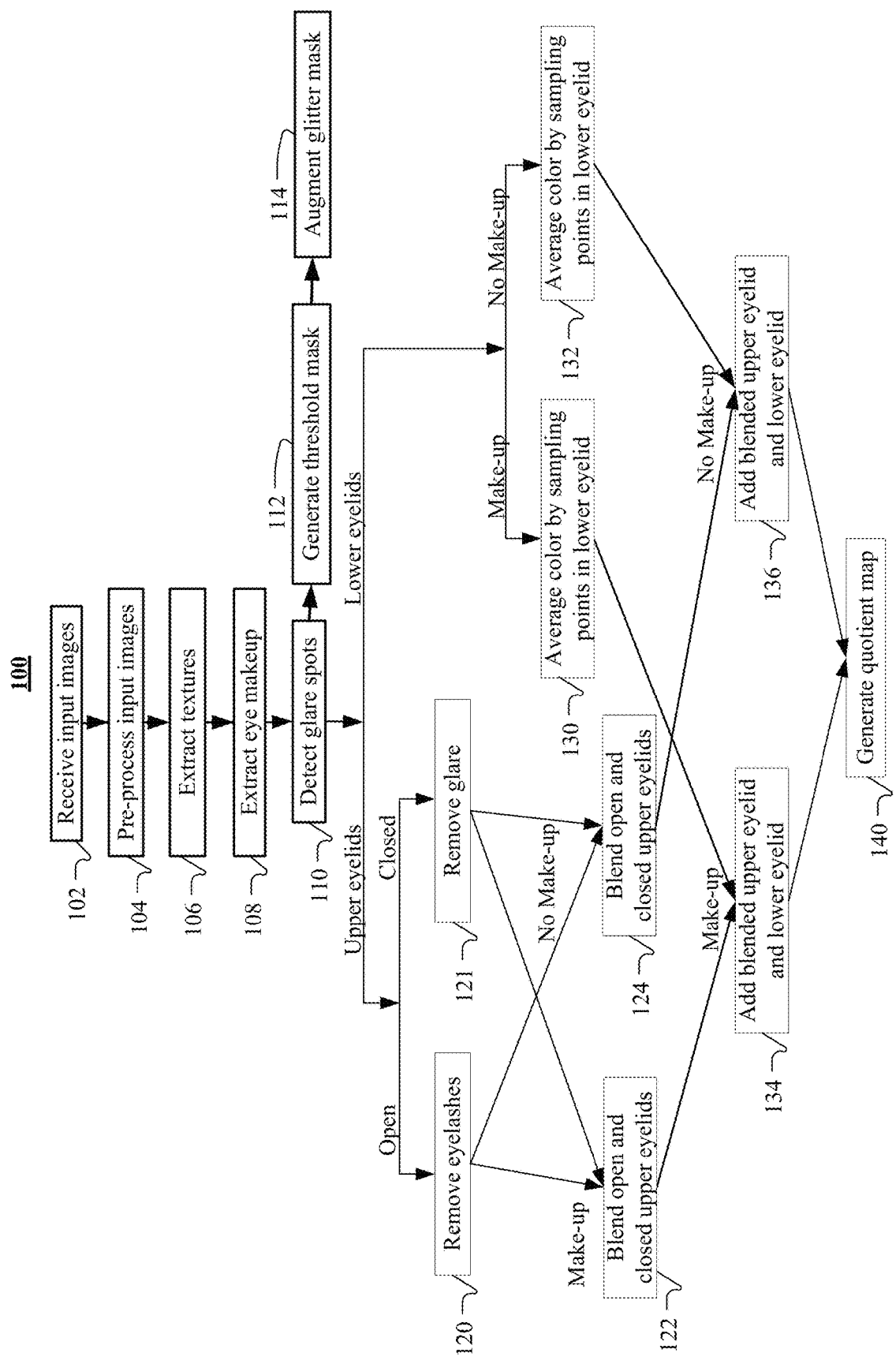
FIGS. 1A-1B illustrate an exemplary method for extracting a make-up effect from images of a face, according to various embodiments.
Figure 1B:
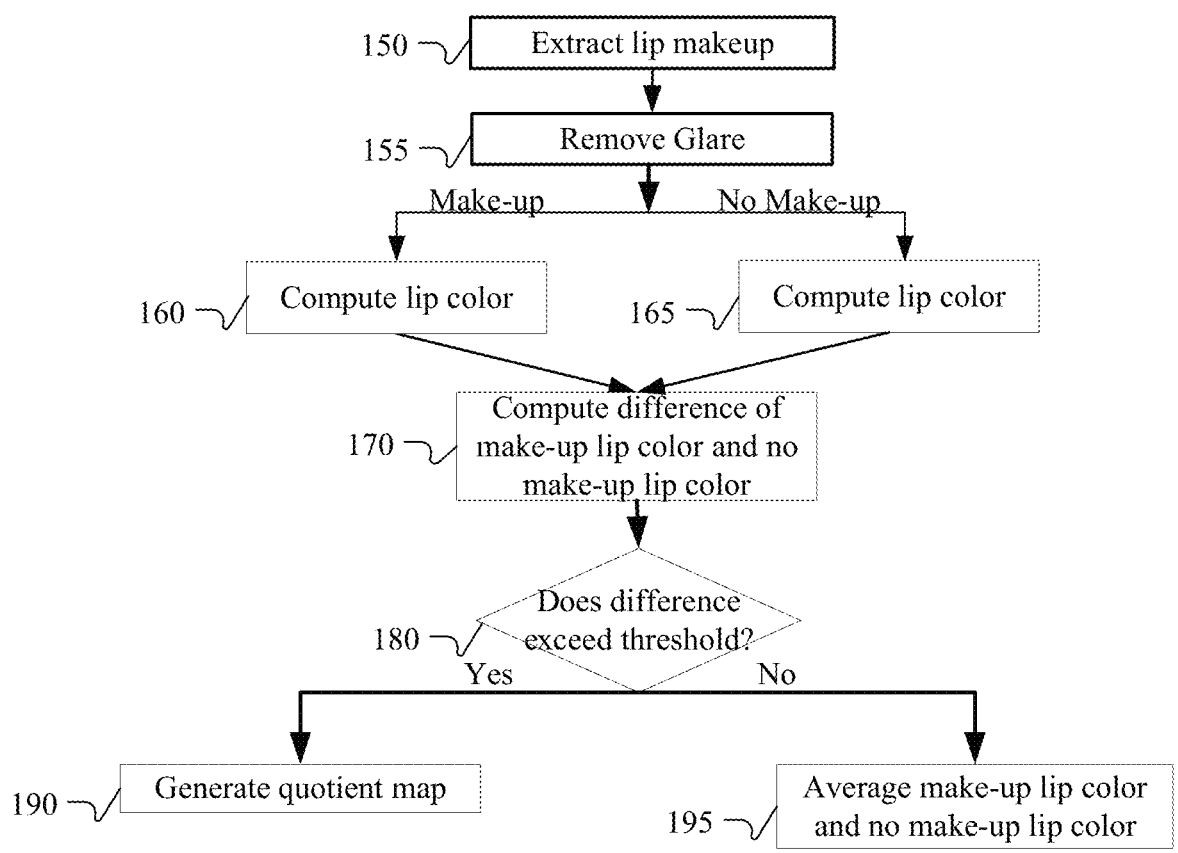

FIGS. 1A-1B illustrate an exemplary method 100 for extracting a make-up effect from images of a face, according to various embodiments. In particular, FIG. 1A illustrates a method 100 for extracting a make-up effect from the upper and lower eyelids of a user. The method 100 begins at step 102, where an AR application receives input images. The input images may correspond to an image of a face. In particular, the input images may include four images corresponding to a face with make-up and eyelids open, a face with make-up and eyelids closed, a face without make-up and with eyelids open, and a face without make-up and with eyelids closed. In various embodiments, the background of the images may be a constant white or neutral color and hair may be removed from around each eye of the face. Although having a white or other neutral color may improve results, it is not necessary. For example, the background may be any color, include any object, or be illuminated with any lighting.

In step 104, the AR application may perform one or more pre-processing steps on the input images. For example, and not by way of limitation, the AR application may white balance an image, perform histogram equalization, and/or resize an input image. At step 106, the AR application may extract textures from the input images. In particular, the AR application may flatten the face in each image in order that the position of each eye and each lip may be consistent for each of the four images.

In step 108, the AR application extracts eye makeup. In particular, the AR application may apply one or more binary masks to each of the input images. The binary masks may extract one or more elements of the face. In particular, multiplying the binary mask to the input images may generate one or more masks, including, for example and not by way of limitation, a lip mask, an upper eyelid mask, a low eyelid mask, and so forth.

In step 110, the AR application may detect glare spots on the upper eyelid mask and the lower eyelid mask. In particular, the AR application may multiply the upper eyelid mask and the lower eyelid mask by a Gaussian blur function and further comparing each modified mask to a threshold. In step 112, the AR application may generate a threshold mask by adding each portion of the modified masks to a threshold mask of the upper eyelid and the lower eyelid. In step 114, the AR application may add the threshold mask to a glitter mask to generate an augmented glitter mask. The augmented glitter mask may include portions of a face that exhibit larger amounts of specular reflections.

In step 120, the AR application may remove eyelashes from the upper eyelid mask corresponding to an open eyelid. In particular, the AR application may implement an edge detection algorithm to identify edges in the upper eyelid mask. The AR application may further remove the identified edges and in-paint holes generated by removing the identified edges. For example, and not by way of limitation, in-painting one or more removed edges may include determining an average color around a removed edge and setting pixels that represented the edge to the average color.

In step 121, the AR application may remove glare spots from the upper eyelid mask corresponding to a closed eyelid by blending each in-painted upper eyelid mask with a corresponding closed upper eyelid mask. In particular, in step 122, the AR application may blend the in-painted upper eyelid mask corresponding to a face with make-up and with an open eyelid with the upper eyelid mask corresponding to a face with make-up and with a closed eyelid. In step 124, the AR application may blend the in-painted upper eyelid mask corresponding to a face without make-up and with an open eyelid with the upper eyelid mask corresponding to a face without make-up and with a closed eyelid.

In various embodiments, the AR application may also process the lower eyelid masks. In particular, because the lower eyelid may be occluded by eyelashes, the AR application may sample one or more points of a lower eyelid. For example, the AR application may sample points in the inner corner of the lower eyelid. The AR application may also average the color of the sampled points and generate a solid lower eyelid texture using the average color. In step 130, the AR application calculates the average color for the lower eyelids with make-up. In step 132, the AR application calculates the average color for the lower eyelids without make-up.

Accordingly, the AR application may generate four partial eyelid masks:
1. A blended upper eyelid mask corresponding to a face with make-up
2. A blended upper eyelid mask corresponding to a face without make-up
3. A lower eyelid mask corresponding to a face with make-up
4. A lower eyelid mask corresponding to a face without make-up In step 134, the AR application may generate an eyelid mask with make-up by adding the blended upper eyelid mask corresponding to a face with make-up and the lower eyelid mask corresponding to a face with make-up. In addition, in step 136, the AR application may generate an eyelid mask without make-up by adding the blended upper eyelid mask corresponding to a face without make-up and the lower eyelid mask corresponding to a face without make-up.

In step 140, the AR application generates a quotient map by dividing the eyelid mask with make-up by the eyelid mask without make-up. The AR application may apply the quotient map and/or the glitter mask to an image of a face to generate an AR effect as described below.

In various embodiments, FIG. 1B illustrates a method 100 for extracting a make-up effect from the lips of a user. The method 100 begins at step 150, where the AR application extracts lip make-up. In particular, the AR application may apply one or more binary masks to each of the input images. The binary masks may extract one or more elements of the face. In particular, multiplying the binary mask to the input images may generate one or more masks, including, for example and not by way of limitation, a lip mask, an upper eyelid mask, a low eyelid mask, and so forth.

In step 155, the AR application may identify and remove glare spots in the lip mask. In particular, the AR application may multiply the lip mask by a Gaussian blur function to identify regions of the lip mask that exhibit specular reflections. The AR application may further remove and in-paint these regions.

In addition, the AR application may compute an average lip color for each lip mask. For example, the AR application may average a color value of each pixel in a lip mask. In particular, in step 160, the AR application may compute an average lip color for a lip mask with make-up. In step 165, the AR application may compute an average lip color for a lip mask without make-up. In step 170, the AR application may compute a difference between the average lip color with make-up and the average lip color without make-up. In step 180, the AR application may determine if the computed difference exceeds a threshold. If the computed difference exceeds, then the method 100 proceeds to step 190, where the AR application may generate a quotient map by dividing the lip mask with make-up by the lip mask without make-up. The quotient map may be utilized to generate an AR effect as described below.

If the computed difference does not exceed the threshold, then the method 100 may proceed to step 195, where the AR application may generate a solid color lip texture by computing the average of (1) the average lip color with make-up and (2) the average lip color without make-up. The AR application may further generate a solid color lip texture using the computed average color, which may be implemented in generating an AR effect as described below.

FIG. 2 illustrates an example first input data processed by the AR application, according to various embodiments. In particular, first input data may include one or more images, such as image 210, image 220, image 230, and image 240. For example, image 210 describes a face with eyes open and without make-up, image 220 describes a face with eyes closed and without make-up, image 230 describes a face with eyes open and with one or more coatings of make-up, and image 240 describes a face with eyes closed and with one or more coatings of make-up.

In particular embodiments, the first input data may include one or more images of an object (e.g., a face) with or without one or more coatings (e.g., one or more coatings of make-up) and in one or more states (e.g., eyes open and/or eyes closed). However, any collection of images corresponding to an object in one or more states and with or without one or more coatings may be included in first image data.

In addition, the AR application may process the first input data to generate one or more intermediate textures. For example, and not by way of limitation, the AR application may perform one or more operations to the first input data, including, for example and not by way of limitation, white balancing, histogram equalization, image resizing, texture extraction, and so forth. In particular, in various embodiments, the AR application may resize each of the image 210, image 220, image 230, and image 240 to one or more image sizes (e.g., 1024×1024). In addition, the AR application may white balance each image by adjusting an intensity of one or more colors in each image to correct for color abnormalities. In particular, the AR application may correct color abnormalities in pixels corresponding to white and/or neutral colors.

FIG. 3 illustrates an example of texture extraction on first input data, according to various embodiments. In particular, system environment 300 includes image 310 corresponds to a texture extracted version of image 210, image 320 corresponds to a texture extracted version of image 220, image 330 corresponds to a texture extracted version of image 230, and image 340 corresponds to a texture extracted version of image 240.

In various embodiments, after the AR application implements one or more image processing technique (e.g., image re-sizing, white balancing, and/or histogram equalization), the AR application may perform texture extraction on one or more images of the first input data. In particular, the AR application implement one or more texture extraction techniques (e.g., ray casting, subdivision, etc.) to convert an image included in the first input data into a stretched image. A stretched image may include a two-dimensional texture that represents a three-dimensional object depicted in an image. As shown in system environment 300, texture extraction may flatten a three-dimensional object (e.g., a face), while preserving the surface texture of various elements of the face (e.g., the texture of a lip, an eyelid, a nose, etc.). In various embodiments, the position of an element (e.g., an eye, a nose, a lip, etc.) of a two-dimensional texture (e.g., image 310) representing an object (e.g., a face) may match the position of a similar element in a second two-dimensional texture (e.g., image 330) representing the object.

FIG. 4 illustrates one or more binary masks generated from texture extraction of an object, according to various embodiments. In particular, binary map 410 includes a shape of one or more lips, binary map 420 includes a shape of one or more upper eyelids, and binary map 430 includes a shape of one or more lower eyelids.

In various embodiments, the AR application may generate a binary mask from one or more texture-extracted images (e.g., image 330, image 340, etc.). Each binary mask may store a shape of one or more elements of a texture-extracted image using bits. For example, a binary mask may store a value of 1 for each pixel of the texture-extracted images that corresponds to a desired element. In addition, the binary mask may store zeros for other pixels. Accordingly, as shown in system environment 400, a binary mask 410 may store a value of 1 for each pixel that corresponds to a shape of a lip, while storing a value of 0 for other pixels. Accordingly, each binary mask 410, 420, and 430 may function as a filter that selects pixels from a texture-extracted image that corresponds to a desired element of an object.

FIG. 5 illustrates example output textures corresponding to one or more elements of an object, according to various embodiments. As shown, system environment 500 includes element-specific texture 510, solid color output texture 520, fractional output texture 530, and integer output texture 540. In various embodiments, element-specific texture 510 may be defined as the product of binary mask 410 and texture-extracted image 330. Accordingly, element-specific texture 510 includes the portion of texture-extracted image 330 that corresponds to a shape of one or more lips. In particular, element-specific texture 510 may include one or more coatings (e.g., coatings of cosmetic products) disposed on the lips. In various embodiments, a second element-specific texture may also be generated. In particular, the second element-specific texture may be the product of binary mask 410 and texture-extracted image 310. Accordingly, the second element-specific texture may include the portion of the texture-extracted image 310 that corresponds to a shape of one or more lips. However, unlike element-specific texture 510, the second element-specific texture does not include any coatings on the lips (e.g., coatings of cosmetic products).

In various embodiments, the AR application may apply a Gaussian blur to the element-specific texture 510 to identify specular reflections. The AR application may further remove areas of the element-specific texture 510 with specular reflections and further in-paint those regions. In addition, the AR application may compute an average color of the element-specific texture 510. The AR application may average a set of color values corresponding to pixels of the element-specific texture 510. In various embodiments, the element-specific texture 510 may include one or more color values that the AR application updated due to in-painting. Accordingly, the AR application may use the updated color values when computing the average color value of an element-specific texture 510.

In various embodiments, the AR application may compute a first average color value of a first element-specific texture that corresponds to an element with a coating (e.g., element-specific texture 510). In addition, the AR application may compute a second average color value of the second element-specific texture that corresponds to the element without the coating (e.g., the coating of cosmetic products). Further, the AR application may compute a difference between the first average color value and the second average color value. If the difference is less than a threshold, then the AR application may use the computed average color value to generate an output texture for the element. For example, solid color output texture 520 illustrates an output texture computed by taking the average of the element-specific texture 510 and the second element-specific texture.

However, in various embodiments, if the difference is greater than or equal to the threshold, then the AR application may utilize one or more quotient maps to generate an output texture for the element. Quotient maps are particularly suitable for dark, strong colors. However, quotient maps are not the only way in which color may be represented. For example, in particular embodiments, the AR application may generate an output texture using one or more solid colors. In particular, when generating a quotient map, the AR application may divide the first average color value by the second average color value. The AR application may store the quotient of the first average color value and the second average color value in a quotient map. Similarly, or alternatively, the AR application may compute a per pixel quotient of a color value of the element-specific texture 510 by a color value of a corresponding pixel of the second element-specific texture. The AR application may further store the computed quotient in a corresponding pixel of the quotient map.

For example, fractional output texture 530 displays a fractional part of a quotient between the element-specific texture 510 and the second element-specific texture. In addition, integer output texture 540 stores an integer part of the quotient of the element-specific texture 510 and the second element-specific texture.

Figure 6:
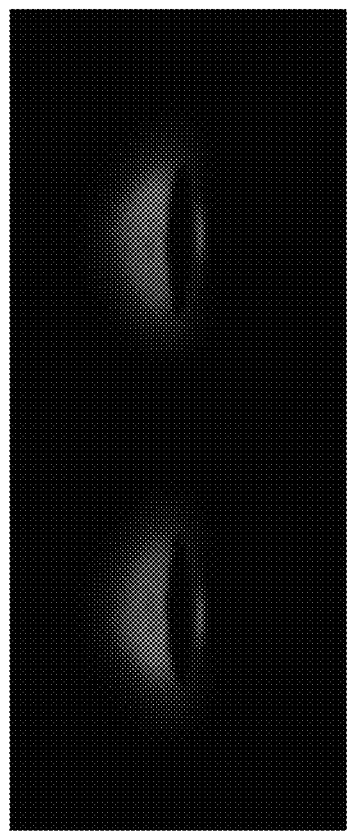
FIG. 6 illustrates an example output texture corresponding to a glitter mask, according to various embodiments.

FIG. 6 illustrates an example output texture 610 corresponding to a glitter mask, according to various embodiments. As shown in system environment 600, output texture 610 includes a glitter mask. A glitter mask may identify one or more regions of an object for modification by a shader application. In particular, the shader application may add one or more color speckles to areas of the object corresponding to the regions identified in the glitter mask. Adding color speckles may increase an amount of glitter originating from the identified regions.

In various embodiments, the AR application may apply a Gaussian blur filter to an element-specific texture to identify specular reflections. In addition, the AR application may implement a threshold mask to identify a set of regions of the element-specific threshold that exceeds a threshold pixel intensity. The AR application may store the location of each element of the set of regions in a glitter mask. In various embodiments, the AR application may generate a default glitter mask that identifies one or more regions of an object for filling with color speckles. The AR application may further add the identified set of regions to the one or more regions of the default glitter mask. The AR application may further generate an output texture based on the combined glitter masks and transmit to output texture to a studio application.

Figure 7:
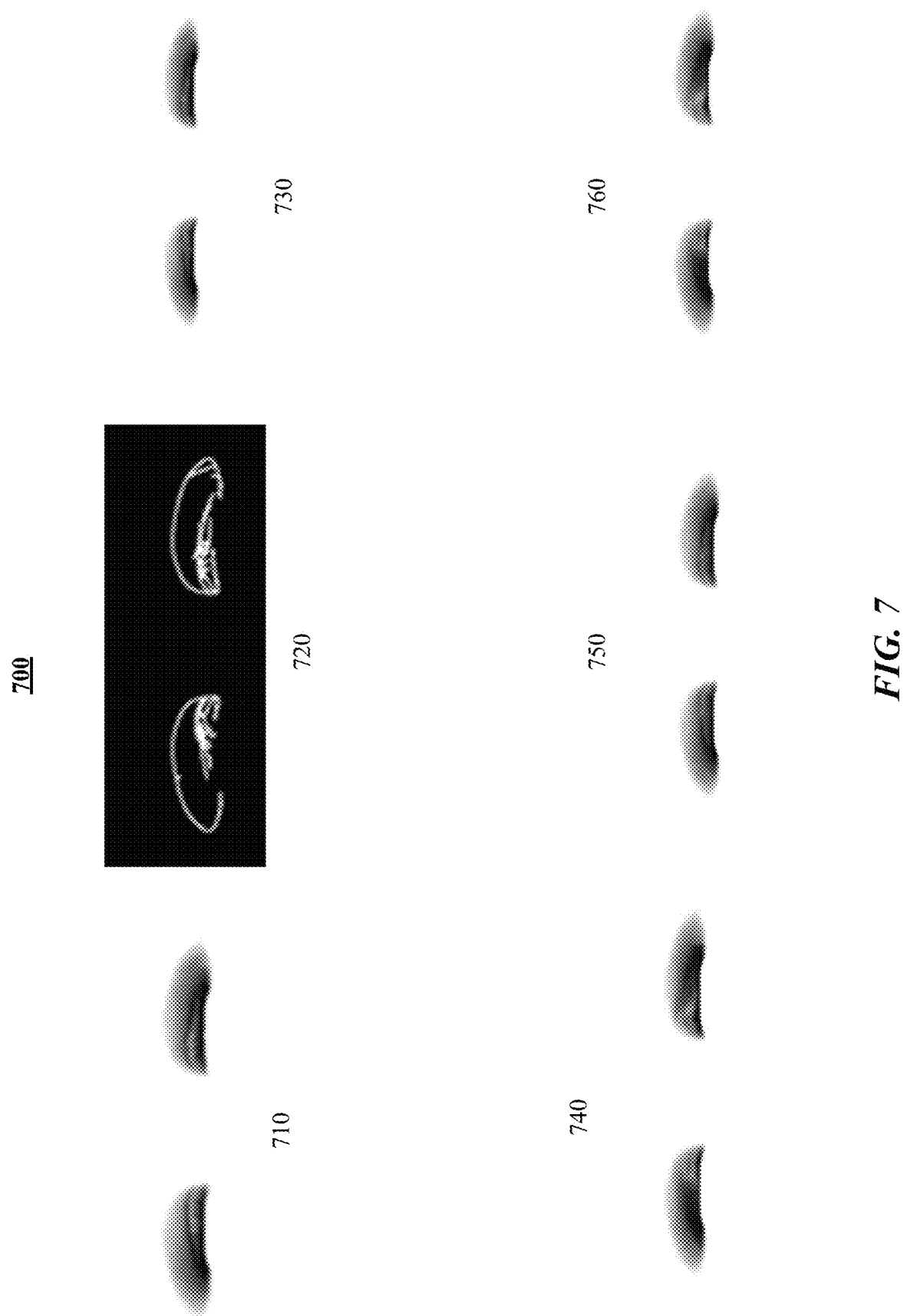
FIG. 7 illustrates an example technique for removing artifacts from elements, according to various embodiments.

FIG. 7 illustrates an example technique for removing artifacts from elements, according to various embodiments. In particular, system environment 700 includes element-specific texture 710, edges 720, and element-specific texture 730. In addition, system environment 700 includes open element-specific texture 740, closed element-specific texture 750, and blended element-specific texture 760.

In various embodiments, the AR application may use edge detection to remove one or more artifacts from an element-specific texture 710. For example, and not by way of limitation, artifacts may include eye lashes, marks, scars, hair, and/or other visual obstructions. For example, element-specific texture 710 may include one or more eye lashes. Accordingly, the AR application may implement one or more edge detection algorithms to identify and remove artifacts from the element-specific texture 710. For example, the AR application may utilize Canny edge detection to identify one or more edges of an element-specific texture. Edges 720 illustrates one or more identified edges from the element-specific texture 710. The AR application may further remove one or more of the identified edges to remove artifacts from the element-specific texture. In addition, the AR application may in-paint the location of the removed edges using one or more of structural in-painting and textural in-painting. Element-specific texture 730 is an example of element-specific texture 710 with edges 720 removed and in-painted.

In various embodiments, the AR application may generate one or more versions of the element-specific texture 730. In particular, the AR application may generate a first version of the element-specific texture 740 corresponding to eyelids in a closed position and with one or more coatings on the eyelid. In addition, the AR application may generate a second version of the element-specific texture 750 corresponding to eyelids in and in an opened position and with one or more coatings on the eyelids.

In addition, the AR application may generate an intermediate texture by blending the element-specific texture 740 and the element-specific texture 750. For example, the AR application may implement seamless cloning to blend the element-specific texture 740 and the element-specific texture 750, which is illustrated by element-specific texture 760. The AR application may perform color-based and/or texture-based blending to generate the element-specific texture 760.

Figure 8:
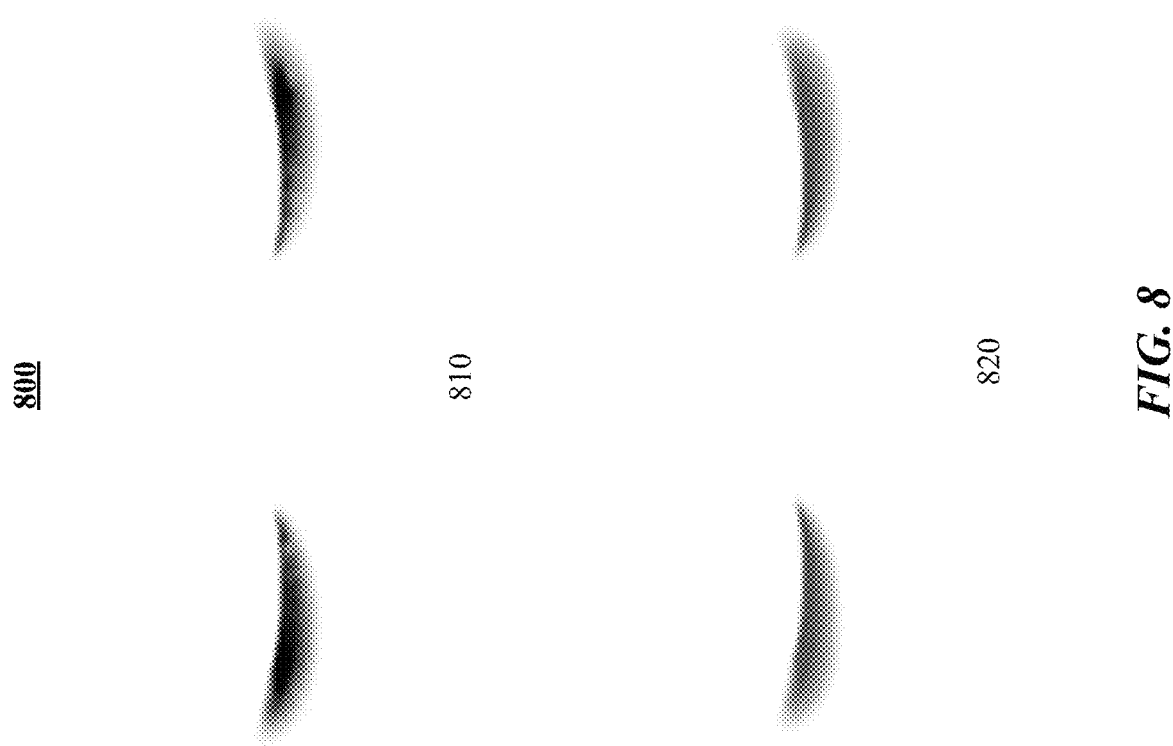
FIG. 8 illustrates a random sampling technique for generating an intermediate texture, according to various embodiments.

FIG. 8 illustrates a random sampling technique for generating an intermediate texture, according to various embodiments. In particular, system environment 800 includes element-specific texture 810 and modified element-specific texture 820. In embodiments where artifacts occlude large portions of extracted-texture 810 in one or more states, the AR application may implement a random sampling technique. For example, the AR application may sample a color value of one or more portions of element-specific texture 810. For example, the AR application may sample a color value at one or more random points at an inner corner of element-specific texture 810

The AR application may further compute an average color value from the sample points. In particular, the AR application may average the sample points of the element-specific texture 810 to produce a first average color value. The AR application may utilize the first average color value to generate a modified element-specific texture 820. For example, the AR application may generate the modified element-specific texture 820 by changing a color value of each pixel of the element-specific texture 810 to the first average color value.

In addition, the AR application may generate a second element-specific texture corresponding to the lower eyelids without a coating (e.g., without a coating of cosmetic products). The AR application may further sample one or more points of the second element-specific texture and compute an average color of the sampled points. Furthermore, the AR application may generate a second modified element-specific texture by replacing the color values of the second element-specific texture with the computed average color value.

In addition, the AR application may generate one or more composed intermediate textures. For example, the AR application may compose the modified element-specific texture 760 for the upper eyelid with a coating and the modified element-specific texture 820 for the lower eyelid also with a coating. Similarly, the AR application may compose a modified element-specific texture corresponding to the upper eyelid without any coatings and a modified element-specific texture for a lower eyelid without any coatings. In addition, the AR application may generate one or more output textures for one or more eyes by computing a quotient map of the composed intermediate textures.

Figure 9:
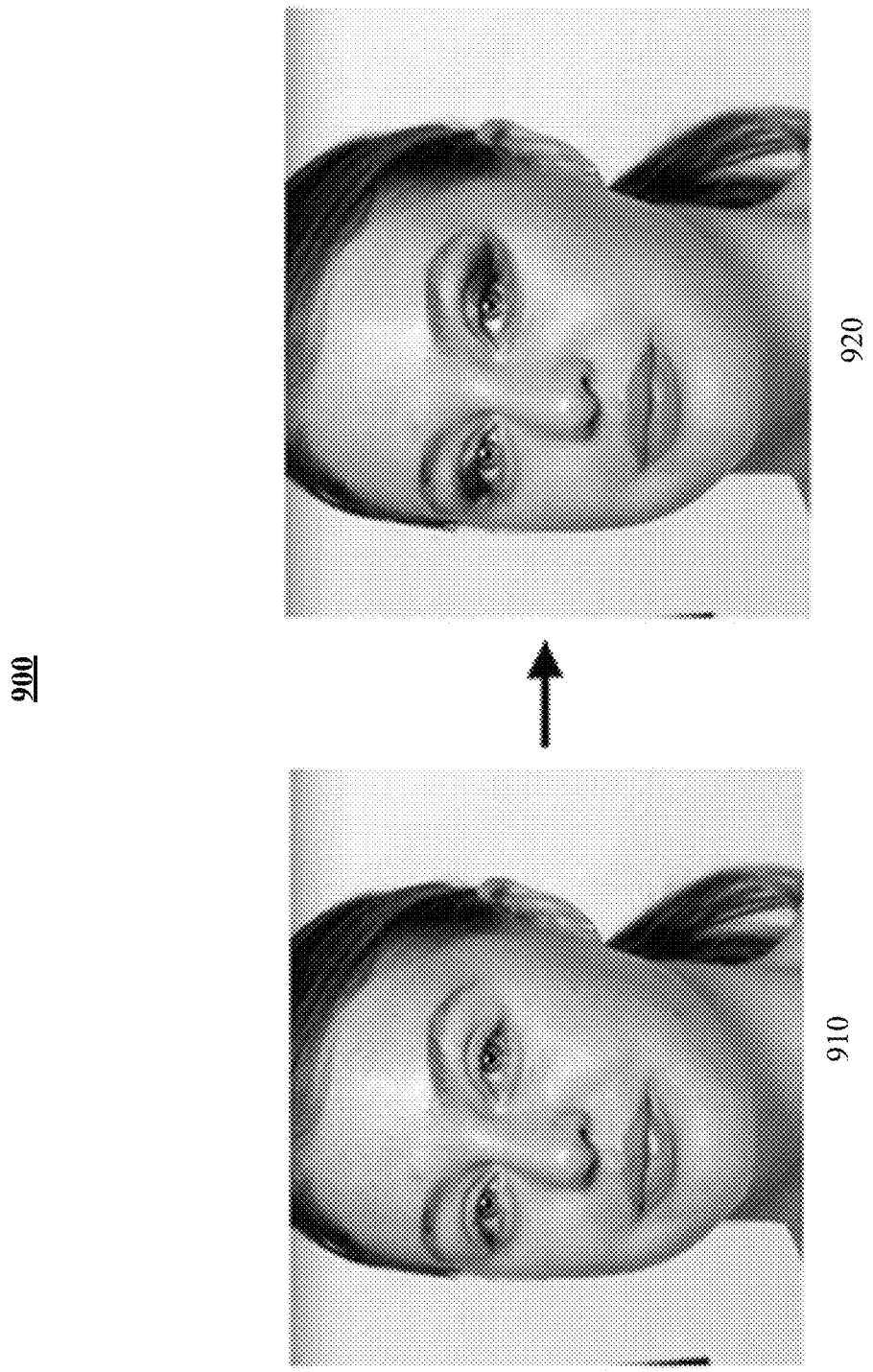
FIG. 9 illustrates an AR effect generated on an image based on one or more output textures, according to various embodiments.

FIG. 9 illustrates an AR effect generated on an image based on one or more output textures, according to various embodiments. In particular, system environment 900 may include second input data (e.g., image 910). In addition, one or more output coatings may be multiplied to second input data to produce AR effect 920. In various embodiments, the AR application may transmit one or more generated output textures to a studio application. In particular, the AR application may transmit one or more output textures corresponding to each element of an object specified by the first input data. For example, and not by way of limitation, the AR application may transmit one or more output textures corresponding to an eye, one or more output textures corresponding to one or more lips, an output texture corresponding to a glitter mask, and so forth. In various embodiments, for various elements, a first output texture may correspond to an integer part of a computed quotient map, while a second output texture may correspond to a fractional part of a computed quotient map.

In various embodiments, the studio application may receive one or more output textures transmitted by the AR application. In addition, the studio application may receive second input data. The second input data may correspond to one or more images of an object. For example, second input data may include image 910. In various embodiments, the studio application may multiply one or more output textures to the second input data to generate AR effect 920. For example, the AR application may multiply fractional output coating 530, integer output coating 540, a fractional output coating corresponding to a coating around one or more eyes, an integer output coating corresponding to a coating around one or more eyes, and so forth.

In addition, the studio application may configure one or more shader applications to generate one or more color speckles in regions of an output texture corresponding to a glitter mask. In addition, the studio application may apply additional effects to an AR effect 920, including, for example and not by way of limitation, additional glitter effects, glossiness effects, lighting effects, camera effects, blush effects, smoothing effects, etc. For example, the studio application may apply one or more blush effects to a cheek and/or smoothing effects to various parts of an object (e.g., the skin on a face, on a chin, etc.).

In further embodiments, the transfer technique may be applied to various types of objects as described below. In particular, The AR application may be stored in a client system. The AR application may receive first input data corresponding to one or more images. In particular, the AR application may receive one or more images that corresponds to a texture to be generated. For example, and not by way of limitation, the image(s) may correspond to a coating (e.g., a powder, a film, a mask, a layer, etc.) placed over an object (e.g., a face, a hand, a body part, a manikin, etc.). In some embodiments, the first input data may correspond to an image(s) of one or more coatings of cosmetic products (e.g., make-up, lipstick, eye shadow, etc.) placed on a face. In particular, the first input data may include an image of a face with one or more coatings of cosmetic products and an image of a face without cosmetic products. In addition, the first input data may correspond to one or more states of an object. For example, the first input data may correspond to a face with one or more eyes open or closed, a face with lips open or pursed, and so forth.

In an example embodiment, the first input data may include four images: an image of a face with eyes open and with one or more coatings of cosmetic products, an image of a face with eyes closed and with one or more coatings of cosmetic products, an image of a face with eyes open without any coatings of cosmetic products, and an image of a face with eyes closed and without any coatings of cosmetic products. However, any collection of images corresponding to an object in one or more states and with or without one or more coatings may be included in first image data.

In addition, the AR application may pre-process the first input data so that the images therein have a uniform baseline. For example, and not by way of limitation, the AR application may perform one or more operations to the first input data, including, for example and not by way of limitation, white balancing, histogram equalization, image resizing, texture extraction, and so forth. For example, in some embodiments, the AR application may perform one or more white balancing routines on first input data. In particular, the AR application may adjust an intensity of one or more colors in an image to correct for color abnormalities in pixels of the image that display neutral and/or white colors. For example, the AR application may utilize one or more of red-green-blue scaling, X-Y-Z scaling, the Von Kries method, and so forth to select one or more color intensities to increase and/or decrease. In addition, the AR application may implement one or more histogram equalization techniques to adjust contrast in an image. For example, the AR application may increase the pixel color and/or intensity range of an image utilizing histogram equalization to increase an amount of contrast in an image. In addition, the AR application may resize one or more images included in the first input data. For example, the AR application may resize and/or crop the image(s) to one or more image sizes, such as, for example and not by way of limitation, 1024×1024 pixels, 1024×768 pixels, 1024×600 pixels, 240×160 pixels, and so forth. However, any image size is within the scope of this disclosure.

In various embodiments, the AR application may extract one or more parameters (e.g., color, shape, thickness, etc.) of a coating on one or more lips of face. For example, and not by way of limitation, the AR application may perform texture extraction on the first input data. For example, in some embodiments, the AR application may implement one or more texture extraction techniques (e.g., ray casting, subdivision, feature detection and modeling techniques, etc.) to convert an image included in the first input data into a stretched image. A stretched image may include a two-dimensional texture that is designed to be wrapped onto a three-dimensional object depicted in an image. For example, the two-dimensional texture may represent one or more contours of an image of a face. In addition, the contours may represent various elements of an object (e.g., a face), such as, for example and not by way of limitation, a forehead, a cheek, an eyebrow, an eyelash, an eye, a nose, a mouth, a lip, a chin, and so forth. The AR application may perform texture extraction on each image included in the first input data. For example, the first input data may include two or more images of an object. The AR application may perform texture extraction on each image to produce one or more two-dimensional textures corresponding to each image. In various embodiments, the position of element of a first two-dimensional texture representing an object may match the position of a similar element in a second two-dimensional texture representing the object. For example, a position of a right eye in a two-dimensional texture representing a face may match a position of a right eye in another two-dimensional texture representing the face.

The AR application may further perform one or more processing steps to the stretched images to generate an intermediate texture. In particular, the AR application may generate binary masks from one or more of the two-dimensional textures representing the object. Additionally, or alternatively, the AR application may implement one or more pre-defined or generic binary masks of the object. For example, and not by way of limitation, the AR application may implement a pre-defined binary mask of a pair of lips. The binary masks may include binary bits associated with particular pixel locations that represent a shape of one or more elements of the object, while masking out other elements of the object. For example, a binary mask may include one or more contours representing a lip of a face. Similarly, another binary mask may include one or more contours representing one or more eyes of a face (e.g., an upper eyelid or a lower eyelid).

The AR application may further utilize one or more of the binary masks to generate an intermediate texture. An intermediate texture may include an average color of a coating on an object. For example, an intermediate texture may include an average color of a coating (e.g., a coating of lipstick) on one or more lips. In particular, the AR application may implement one or more techniques to generate intermediate textures from binary masks and stretched images, including for example and not by way of limitation, color extraction, quotient maps, Gaussian blur, threshold masks, edge detection and removal, in-painting, and so forth.

In various embodiments, the AR application may generate one or more output textures using various techniques. For example, in a first technique, the AR application may multiply one or more stretched images with a binary mask to isolate the shape of one or more elements of an object. For example, a stretched image of a face with a coating (e.g., a coating of cosmetic products) may be multiplied by a binary mask that describes a shape of one or more lips to isolate the section of the stretched image that corresponds to one or more lips. The isolated section of the stretched image is herein referred to as an element-specific texture.

In addition, the AR application may apply a Gaussian blur filter to an element-specific texture to identify specular reflections. In particular, the AR application may utilize the Gaussian blur filter with element-specific textures corresponding to elements with a coating. The AR application may identify regions of the element-specific texture that corresponds to specular reflections of light reflecting off of the coating (e.g., a coating of lipstick on one or more lips). Furthermore, the AR application may in-paint the identified regions to remove glare from an element-specific texture. For example, the AR application may utilize one or more of structural in-painting and textural in-painting to replace the identified regions of the element-specific texture with color patterns that match the two-dimensional textures around the identified regions. Accordingly, glare may be reduced in the element-specific textures, while maintaining texture patterns.

In addition, the AR application may compute an average color of an element-specific texture. In particular, the AR application may average a set of color values corresponding to pixels of the element-specific texture. In various embodiments, the element-specific texture may include one or more color values that the AR application updated due to in-painting. Accordingly, the AR application may use the updated color values when computing the average color value of an element-specific texture.

In various embodiments, the AR application may compute a first average color value of a first element-specific texture that corresponds to an element with a coating (e.g., lips with one or more coatings of lipstick). In addition, the AR application may compute a second average color value of a second element-specific texture that corresponds to the element without the coating (e.g., lips without any coatings of lipstick). Further, the AR application may compute a difference between the first average color value and the second average color value. If the difference is less than a threshold, then the AR application may use the computed average color value to generate an output texture (e.g., lipstick AR effect) for the element (e.g., lips of a face). In particular, the average color value may be stored in a color map that corresponds to the element-specific texture. However, unlike the element-specific texture, each entry of the color map may store the average color value. In various embodiments, the color map may be defined as an output texture.

If, when the AR application computes the difference between the first average color value and the second average color value, the difference is greater than or equal to the threshold, then the AR application may utilize one or more quotient maps to generate output textures for the element. For example, the AR application may divide the first average color value by the second average color value. The AR application may store the quotient of the first average color value and the second average color value in a quotient map. Similarly, or alternatively, the AR application may compute a per pixel quotient of a color value of the first element-specific texture divided by a color value of a corresponding pixel of the second element-specific texture.

In various embodiments, the AR application, may store the computed quotient in a quotient map. In particular, the AR application may store an integer part of the quotient of the first element-specific texture and the second element-specific texture in a first quotient map. The AR application may further store the fractional part of the quotient in a second quotient map. Additionally, or alternatively, the AR application may store the integer part of each per pixel quotient in a first quotient map. In addition, the AR application may store the fraction part of each per pixel quotient in a second quotient map. In various embodiments, each of the first quotient map and the second quotient map may be utilized as output textures.

In various embodiments, the AR application may extract one or more parameters (e.g., color, shape, thickness, etc.) of a coating on one or more eyelids of a face. For example, and not by way of limitation, the AR application may produce output textures utilizing a second technique as described below. In particular, as described above, the AR application may multiply one or more stretched images with a binary mask to isolate the shape of one or more elements of an object. For example, a stretched image of a face with a coating may be multiplied by a binary mask that describes a shape of an element (e.g., an upper eyelid, a lower eyelid, etc.) to isolate the section of the stretched image that corresponds to the element. The isolated section of the stretched image is herein referred to as an element-specific texture.

In various embodiments, the AR application may apply a Gaussian blur filter to an element-specific texture to identify specular reflections. In addition, the AR application may implement a threshold mask to identify a set of regions of the element-specific threshold that exceeds a threshold pixel intensity. The AR application may store the location of each element of the set of regions in a glitter mask. In various embodiments, the AR application may generate a default glitter mask that identifies one or more regions of an object for filling with color speckles. The AR application may further add the identified set of regions to the one or more regions of the default glitter mask. The AR application may further generate an output texture based on the combined glitter masks and transmit the output texture to a studio application.

In various embodiments, the AR application may use edge detection to remove one or more artifacts from an element-specific texture. Artifacts may include, for example and not by way of limitation, eye lashes, marks, scars, hair, and/or other visual obstructions. For example, the AR application may utilize Canny edge detection to identify one or more edges of an element-specific texture. The AR application may further remove one or more of the identified edges to remove artifacts from the element-specific texture. In addition, the AR application may in-paint the location of the removed edges using one or more of structural in-painting and textural in-painting.

For example, the AR application may use edge detection on an element-specific texture corresponding to an upper eyelid with a coating (e.g., a coating of make-up). In particular, the AR application may utilize Canny edge detection to remove edges from the element-specific texture, thereby removing artifacts such as eyelashes from the element-specific texture. In addition, the AR application may in-paint the location of the removed edges by interpolating one or more textures and/or one or more colors from pixels surrounding each removed edge.

In addition, the AR application may generate an intermediate texture based on one or more in-painted element-specific textures. In particular, the AR application may blend a first element-specific texture corresponding to an element in a first state with one or more other element-specific textures corresponding to an element in a second state, a third state, a fourth state, and so forth. For example, the AR application may use seamless cloning to blend a first in-painted element-specific texture corresponding to an upper eyelid in an open position with a second in-painted element-specific texture corresponding to the upper eyelid in a closed position. In particular, the AR application may implement gradient blending, Poisson blending, and so forth. In various embodiments, blending in-painted element-specific textures in different states may reduce visual artifacts, such as specular reflections and glare. In particular, the AR application may perform color and/or texture blending on the first in-painted element-specific texture and the second in-painted element-specific texture to generate an average color value corresponding to the element. In various embodiments, the AR application may use blending to calculate a per pixel average color value of the in-painted element-specific texture corresponding to an upper eyelid with a coating and an average per pixel average color value of the in-painted element-specific texture corresponding to an upper eyelid without any coatings. Additionally, or alternatively, the AR application may use blending to compute a single average color value for the in-painted element-specific texture corresponding to the upper eyelid with a coating and a single average color value for the in-painted element-specific texture corresponding to the upper eyelid without the coating.

In various embodiments, in addition to, or as an alternative to using edge detection, edge removal, and in-painting, the AR application may sample the color value of one or more parts of an element-specific texture. For example, the AR application may sample the color value at one or more random points at an inner corner of an element-specific texture corresponding to a lower eyelid. In various embodiments, sampling element-specific textures may be implemented when one or more regions of an element-specific texture is occluded (e.g., when a lower eyelid mask is occluded by eyelashes). In particular, sampling color values of an element-specific texture may enable the AR application to compute an average color of an element-specific texture in the presence of occlusions. In various embodiments, the AR application may sample points of an element-specific texture corresponding to an element with a coating as well as sampling points of an element-specific texture corresponding to an element without the coating. The AR application may further compute an average color value from the sample points. In particular, the AR application may average the sample points of the element-specific texture corresponding to the element with a coating to produce a first average color value. In addition, the AR application may average the sample points of the element-specific texture corresponding to the element without any coatings to produce a second average color value. In various embodiments, the first average color value may be stored in a first intermediate texture and the second average color value may be stored in a second intermediate texture. In various embodiments, the first intermediate texture and the second intermediate texture may be used to generate an output texture as described in further detail below.

In various embodiments, the AR application may compose a first intermediate texture with a second intermediate texture to form a composed intermediate texture. In particular, the AR application may compose a first intermediate texture that describes an element with a coating with a second intermediate texture that describes another element with a coating. In various embodiments, one or more color values of the first intermediate texture may be computed by averaging pixel color values after edge detection, edge removal, and/or in-painting. Similarly, one or more color values of a second intermediate texture may be computed by averaging the color value of randomly sampled points from an element-specific texture. For example, the AR application may compose a first intermediate texture that describes an upper eyelid with a coating and a second intermediate texture that describes a lower eyelid with a coating. The first intermediate texture may be computed by averaging pixel color values after edge detection, edge removal, and/or in-painting, while the second intermediate texture may be computed by averaging pixel color values of randomly sampled pixels.

Similarly, the AR application may compose intermediate textures corresponding to elements without any coatings. Accordingly, the AR application may generate composed intermediate textures corresponding to elements with coatings and composed intermediate texture corresponding to elements without coatings. For example, a first composed intermediate texture may correspond to the composition of an intermediate texture of an upper eyelid with one or more coatings and an intermediate texture of a lower eyelid with one or more coatings. Also, a second composed intermediate texture may correspond to an intermediate texture of an upper eyelid without any coatings and an intermediate texture of a lower eyelid without any coatings.

Furthermore, the AR application may compute a quotient map based on composed intermediate textures to produce an output texture. For example, the AR application may compute a quotient map of the first composed intermediate texture and the second composed intermediate texture. In particular, the AR application may compute a per pixel quotient of a color value of the first composed intermediate texture with a color value of a corresponding pixel of a second composed intermediate texture. Accordingly, the AR application may generate a quotient map that describes a set of color values of one or more coatings disposed on various elements of an object. Similarly, or alternatively, the AR application may compute quotient of an average color value of a first element of the first composed intermediate texture by an average color value of a corresponding element of the second composed intermediate texture. For example, the AR application may compute a quotient of an average color value of a lower eyelid with a coating by an average color value of the lower eyelid without any coatings. Accordingly, the AR application may generate a quotient map that describes set of color values that describes one or more coatings disposed on the lower eyelid of a face.

In various embodiments, the AR application, may further store the computed quotient in a quotient map. In particular, the AR application may store an integer part of the computed quotient (e.g., a per pixel computed quotient and/or an average element computed quotient) in a first quotient map. The AR application may further store a fractional part of the quotient in a second quotient map. The first quotient map and the second quotient map may be designated as output textures for transmission to a studio application.

In various embodiments, the AR application transmits one or more generated output textures to a studio application. In particular, the AR application may transmit one or more output textures corresponding to each element of an object specified by the first input data. For example, and not by way of limitation, the AR application may transmit one or more output textures corresponding to an upper eyelid, one or more output textures corresponding to an eye, one or more output textures corresponding to one or more lips, and so forth. In various embodiments, for various elements, a first output texture may correspond to an integer part of a computed quotient map, while a second output texture may correspond to a fractional part of a computed quotient map.

In various embodiments, the studio application may receive one or more output textures transmitted by the AR application. In addition, the studio application may receive second input data. The second input data may correspond to one or more images of an object. In various embodiments, an object specified by the second input data may be similar to one or more of the objects specified by the first input data. For example, in some embodiments, the first input data may correspond to a face of a first user. Accordingly, the second input data may correspond to a face of a second user. The studio application may select one or more of the output textures and further multiply a color of an object specified by the second input data by one or more of the received output textures in order to generate an AR effect. For example, and not by way of limitation, the studio application may apply an output texture corresponding to a fractional quotient map describing one or more coatings on the upper eyelid and/or lower eyelid of a face, an output texture corresponding to an integer quotient map describing one or more coatings on the upper eyelid and/or lower eyelid of a face, an output texture corresponding to a fractional quotient map describing one or more coatings on one or more lips, and/or an output texture corresponding to an integer quotient map describing one or more coatings on one or more lips. Accordingly, the AR application may apply multiple output textures to an element of an object (e.g., a factional output texture and an integer output texture).

In various embodiments, the AR application may also transmit an output texture corresponding to a glitter mask to the studio application. The glitter mask may include one or more regions of an object that are identified for glitter amplifications. Accordingly, the studio application may configure one or more shader applications to generate one or more color speckles at each of the locations of the AR effect specified by the glitter mask. Additionally, or alternatively, the AR application may apply one or more additional amplifications to the AR effect. For example, and not by way of limitation, the AR application may apply additional glitter effects, glossiness effects, lighting effects, camera effects, and so forth to the AR effect.

Figure 10:
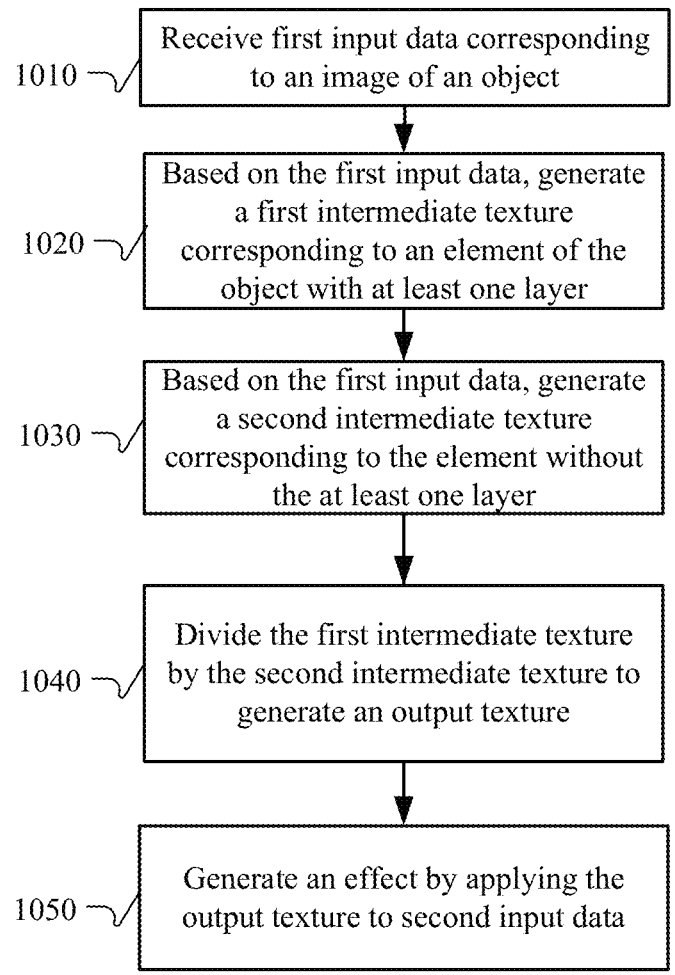
FIG. 10 illustrates an example method for generating an AR effect, according to various embodiments.

FIG. 10 illustrates an example method 1000 for generating an AR effect, according to various embodiments. The method 1000 may begin at step 1010, where the AR application receives first input data corresponding to an image of an object. In various embodiments, the object may include one or more coatings (e.g., a coating of cosmetic products) and the object may be in one or more states (e.g., a face with eyes open, a face with eyes closed, etc.)

At step 1020, based on the first input data, the AR application generates a first intermediate texture corresponding to an element of the object with at least one coating. In particular, the AR application may perform one or more processing steps on the first input data including white balancing, resizing, histogram equalization, and texture extraction. In addition, the AR application may utilize binary masks to generate one or more element-specific textures from a texture-extracted image. The AR application may further compute an average color value for an element-specific texture corresponding to an element of the object with a coating. The average color value may be stored in an intermediate texture for the element.

At step 1030, the AR application generates a second intermediate texture corresponding to the element without the at least one coating. For example, the AR application may generate an element-specific texture from a texture-extracted image of an object without a coating (e.g., an image of a face without cosmetic products). The AR application may further determine an average color of the element-specific texture. For example, the AR application may randomly sample a color value of pixels in the element-specific texture. The AR application may compute an average color value based on the sampled color values and generate an intermediate texture using the computed average color value.

At step 1040, the AR application divides the first intermediate texture by the second intermediate texture to generate an output texture. In particular, the AR application may divide a first intermediate texture corresponding to an element with a coating by a second intermediate texture corresponding to the element without the coating. The AR application may generate a quotient map that stores a per pixel quotient of a color value of the first intermediate texture and a color value of the second intermediate texture. The AR application may store the resulting quotient map as an output texture.

At step 1050, the AR application generates an effect by applying the output texture to second input data. In particular, the AR application may include a studio application. The AR application may pass one or more output textures to the studio application. The studio application may receive the output texture and second input data. The second input data may correspond to an image of an object that may be similar to an object described by one or more images of the first input data. For example, the second input data may describe a face with or without one or more coatings. The studio application may apply an output texture to the face by multiplying the output texture by a color of the face. In addition, the studio application may apply one or more amplifications to the face include glitter, gloss, smoothing, lighting, and so forth.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for generating an AR effect including the particular steps of the method of FIG. 10, this disclosure contemplates any suitable method for generating an AR effect including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
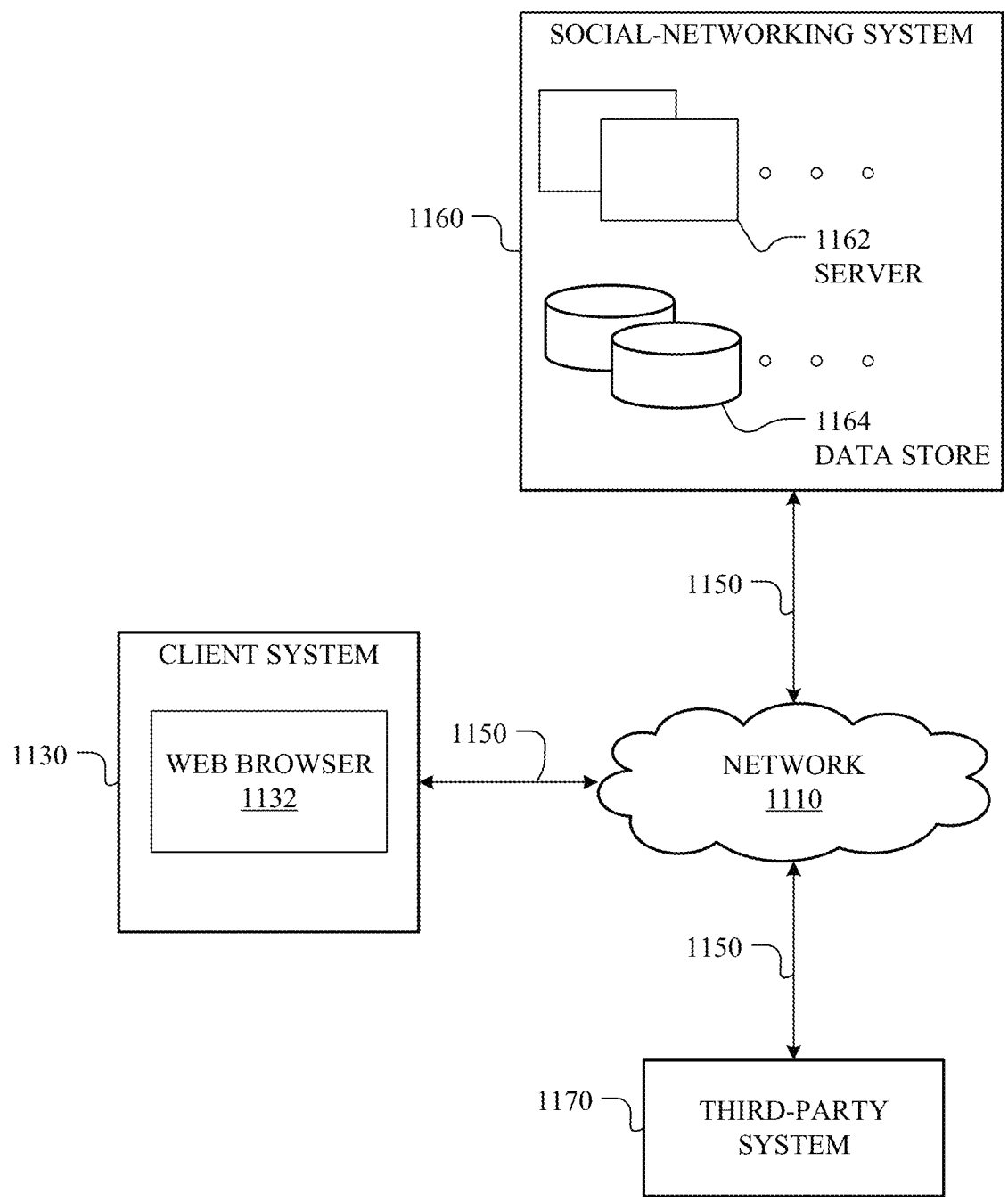
FIG. 11 illustrates an example network environment for implementing the AR application, according to various embodiments.

FIG. 11 illustrates an example network environment 1100 associated with a social-networking system, according to various embodiments. Network environment 1100 includes a client system 1130, a social-networking system 1160, and a third-party system 1170 connected to each other by a network 1110. Although FIG. 11 illustrates a particular arrangement of client system 1130, social-networking system 1160, third-party system 1170, and network 1110, this disclosure contemplates any suitable arrangement of client system 1130, social-networking system 1160, third-party system 1170, and network 1110. As an example, and not by way of limitation, two or more of client system 1130, social-networking system 1160, and third-party system 1170 may be connected to each other directly, bypassing network 1110. As another example, two or more of client system 1130, social-networking system 1160, and third-party system 1170 may be physically or logically co-located with each other in whole or in part. Moreover, although FIG. 11 illustrates a particular number of client systems 1130, social-networking systems 1160, third-party systems 1170, and networks 1110, this disclosure contemplates any suitable number of client systems 1130, social-networking systems 1160, third-party systems 1170, and networks 1110. As an example, and not by way of limitation, network environment 1100 may include multiple client system 1130, social-networking systems 1160, third-party systems 1170, and networks 1110.

This disclosure contemplates any suitable network 1110. As an example and not by way of limitation, one or more portions of network 1110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1110 may include one or more networks 1110.

Links 1150 may connect client system 1130, social-networking system 1160, and third-party system 1170 to communication network 1110 or to each other. This disclosure contemplates any suitable links 1150. In particular embodiments, one or more links 1150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1150, or a combination of two or more such links 1150. Links 1150 need not necessarily be the same throughout network environment 1100. One or more first links 1150 may differ in one or more respects from one or more second links 1150.

In particular embodiments, client system 1130 may be an electronic device including hardware, software, or embedded logic components or a combination of two or more such components and capable of carrying out the appropriate functionalities implemented or supported by client system 1130. As an example, and not by way of limitation, a client system 1130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1130. A client system 1130 may enable a network user at client system 1130 to access network 1110. A client system 1130 may enable its user to communicate with other users at other client systems 1130.

In particular embodiments, client system 1130 may include a web browser 1132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1130 may enter a Uniform Resource Locator (URL) or other address directing the web browser 1132 to a particular server (such as server 1162, or a server associated with a third-party system 1170), and the web browser 1132 may generate a Hyper Text Transfer Protocol (HTTP) request and communicate the HTTP request to server. The server may accept the HTTP request and communicate to client system 1130 one or more Hyper Text Markup Language (HTML) files responsive to the HTTP request. Client system 1130 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In various embodiments, the client system 1130 may also store an AR application. The AR application may receive first input data corresponding to one or more images. The AR application may process the first input data to produce one or more intermediate textures. The AR application may further compute one or more output textures based on the intermediate textures. The AR application may transmit the output textures to a studio application. The studio application may receive the output textures and second input data that corresponds to one or more images. The studio application may apply the output textures to the second input data to generate an augmented reality (AR) effect, as described in further detail below.

In other embodiments, the AR application may be stored in the social-networking system 1160, a third-party platform 1170, and so forth. In particular, the client 1130 may access the AR application using the web browser 1132. In various embodiments, the studio application may be included in the AR application and/or may be separate from the AR application. For example, the studio application may be stored in any or all of the client system 1130, the social-networking system 1160, a third-party platform 1170, and/or another system.

In particular embodiments, social-networking system 1160 may be a network-addressable computing system that can host an online social network. Social-networking system 1160 may generate, store, receive, and send social-networking data, such as, for example, user-profile data, concept-profile data, social-graph information, or other suitable data related to the online social network. Social-networking system 1160 may be accessed by the other components of network environment 1100 either directly or via network 1110. As an example, and not by way of limitation, client system 1130 may access social-networking system 1160 using a web browser 1132, or a native application associated with social-networking system 1160 (e.g., a mobile social-networking application, a messaging application, another suitable application, or any combination thereof) either directly or via network 1110. In particular embodiments, social-networking system 1160 may include one or more servers 1162. Each server 1162 may be a unitary server or a distributed server spanning multiple computers or multiple datacenters. Servers 1162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1162 may include hardware, software, or embedded logic components or a combination of two or more such components for carrying out the appropriate functionalities implemented or supported by server 1162. In particular embodiments, social-networking system 1160 may include one or more data stores 1164. Data stores 1164 may be used to store various types of information. In particular embodiments, the information stored in data stores 1164 may be organized according to specific data structures. In particular embodiments, each data store 1164 may be a relational, columnar, correlation, or other suitable database. Although this disclosure describes or illustrates particular types of databases, this disclosure contemplates any suitable types of databases. Particular embodiments may provide interfaces that enable a client system 1130, a social-networking system 1160, or a third-party system 1170 to manage, retrieve, modify, add, or delete, the information stored in data store 1164.

In particular embodiments, social-networking system 1160 may store one or more social graphs in one or more data stores 1164. In particular embodiments, a social graph may include multiple nodes-which may include multiple user nodes (each corresponding to a particular user) or multiple concept nodes (each corresponding to a particular concept)—and multiple edges connecting the nodes. Social-networking system 1160 may provide users of the online social network the ability to communicate and interact with other users. In particular embodiments, users may join the online social network via social-networking system 1160 and then add connections (e.g., relationships) to a number of other users of social-networking system 1160 to whom they want to be connected. Herein, the term "friend" may refer to any other user of social-networking system 1160 with whom a user has formed a connection, association, or relationship via social-networking system 1160.

In various embodiment, the social-networking system 1160 may store one or more user nodes. The user nodes may include user profiles that indicate user preferences. For example, a first user profile could indicate that a first user prefers to view text-based content objects, while a second user profile could indicate that a second user prefers to listen to audio-based content objects.

In particular embodiments, social-networking system 1160 may provide users with the ability to take actions on various types of items or objects, supported by social-networking system 1160. As an example and not by way of limitation, the items and objects may include groups or social networks to which users of social-networking system 1160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1160 or by an external system of third-party system 1170, which is separate from social-networking system 1160 and coupled to social-networking system 1160 via a network 1110.

In particular embodiments, social-networking system 1160 may be capable of linking a variety of entities. As an example, and not by way of limitation, social-networking system 1160 may enable users to interact with each other as well as receive content from third-party systems 1170 or other entities, or to allow users to interact with these entities through an application programming interfaces (API) or other communication channels.

In particular embodiments, a third-party system 1170 may include one or more types of servers, one or more data stores, one or more interfaces, including but not limited to APIs, one or more web services, one or more content sources, one or more networks, or any other suitable components, e.g., that servers may communicate with. A third-party system 1170 may be operated by a different entity from an entity operating social-networking system 1160. In particular embodiments, however, social-networking system 1160 and third-party systems 1170 may operate in conjunction with each other to provide social-networking services to users of social-networking system 1160 or third-party systems 1170. In this sense, social-networking system 1160 may provide a platform, or backbone, which other systems, such as third-party systems 1170, may use to provide social-networking services and functionality to users across the Internet.

In particular embodiments, a third-party system 1170 may include a third-party content object provider. A third-party content object provider may include one or more sources of content objects, which may be communicated to a client system 1130. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1160 also includes user-generated content objects, which may enhance a user's interactions with social-networking system 1160. User-generated content may include anything a user can add, upload, send, or "post" to social-networking system 1160. As an example, and not by way of limitation, a user communicates posts to social-networking system 1160 from a client system 1130. Posts may include data such as status updates or other textual data, location information, photos, videos, links, music or other similar data or media. Content may also be added to social-networking system 1160 by a third-party through a "communication channel," such as a newsfeed or stream.

In particular embodiments, social-networking system 1160 may include a variety of servers, sub-systems, programs, modules, logs, and data stores. In particular embodiments, social-networking system 1160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1160 may also include suitable components such as network interfaces, security mechanisms, load balancers, failover servers, management-and-network-operations consoles, other suitable components, or any suitable combination thereof. In particular embodiments, social-networking system 1160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1160 to one or more client systems 1130 or one or more third-party systems 1170 via network 1110. The web server may include a mail server or other messaging functionality for receiving and routing messages between social-networking system 1160 and one or more client systems 1130. An API-request server may allow a third-party system 1170 to access information from social-networking system 1160 by calling one or more APIs. An action logger may be used to receive communications from a web server about a user's actions on or off social-networking system 1160. In conjunction with the action log, a third-party-content-object log may be maintained of user exposures to third-party-content objects. A notification controller may provide information regarding content objects to a client system 1130. Information may be pushed to a client system 1130 as notifications, or information may be pulled from client system 1130 responsive to a request received from client system 1130. Authorization servers may be used to enforce one or more privacy settings of the users of social-networking system 1160. A privacy setting of a user determines how particular information associated with a user can be shared. The authorization server may allow users to opt in to or opt out of having their actions logged by social-networking system 1160 or shared with other systems (e.g., third-party system 1170), such as, for example, by setting appropriate privacy settings. Third-party-content-object stores may be used to store content objects received from third parties, such as a third-party system 1170. Location stores may be used for storing location information received from client systems 1130 associated with users. Advertisement-pricing modules may combine social information, the current time, location information, or other suitable information to provide relevant advertisements, in the form of notifications, to a user.

Figure 12:
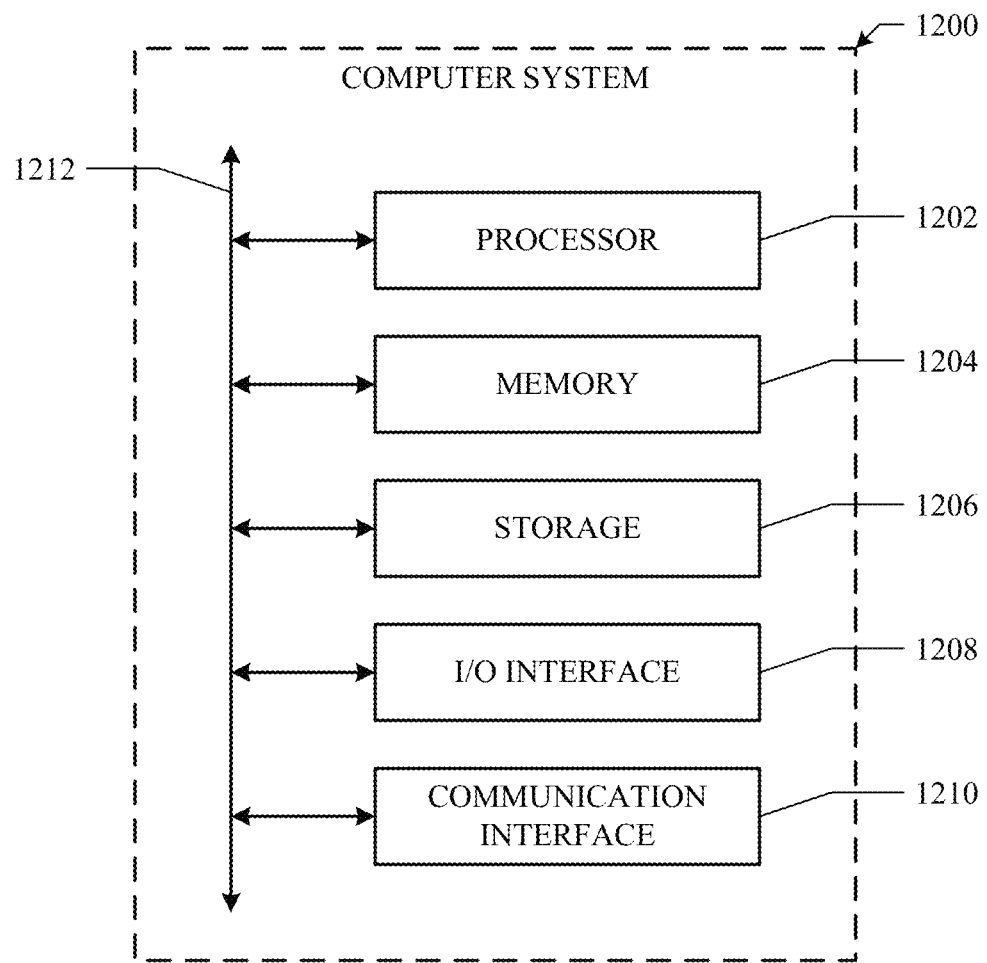
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (IO) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
by one or more computing systems, receiving first input data comprising an image of a face with make-up and with an eyelid in an open position, an image of the face without make-up and with the eyelid in the open position, an image of the face with make-up and with the eyelid in a closed position, and an image of the face without make-up and with the eyelid in the closed position;
by the one or more computing systems, based on the first input data:
generating a first intermediate texture corresponding to the eyelid of the face with make-up, and
generating a second intermediate texture corresponding to the eyelid of the face without make-up;
by the one or more computing systems, generating an output texture based on the first intermediate texture and the second intermediate texture; and
by the one or more computing systems, generating an effect by applying the output texture to second input data comprising a second image of a second face.

2. The method of claim 1, further comprising performing one or more of white balancing, histogram equalization, and resizing of the first input data.

3. The method of claim 1, further comprising:
performing texture extraction on each image of the face to generate a texture-extracted image;
generating a binary mask corresponding to the eyelid of the face; and
multiplying the binary mask by the texture-extracted image to generate an element-specific texture for each image of the face.

4. The method of claim 3, further comprising:
detecting an edge of the element-specific texture;
removing the detected edge; and
in-painting an area of the element-specific texture corresponding to the removed edge.

5. The method of claim 4, further comprising generating an intermediate texture by blending the element-specific texture with a second element-specific texture, wherein the element-specific texture corresponds to the eyelid in the open position and the second element-specific texture corresponding to the eyelid in the closed position.

6. The method of claim 5, further comprising blending a third element-specific texture corresponding to the eyelid in a partially open position with the first element-specific texture and the second element-specific texture.

7. The method of claim 5, wherein blending the element-specific texture and the second element-specific texture comprises seamless cloning of the element-specific texture and the second element-specific texture to generate a modified element-specific texture.

8. The method of claim 3, further comprising:
sampling one or more points of a second element-specific texture corresponding to a lower eyelid;
computing an average color value of the sampled one or more points; and
generating a third intermediate texture corresponding to the lower eyelid based on the average color value.

9. The method of claim 8, further comprising:
generating the first intermediate texture corresponding to the eyelid of the face with make-up by composing a fourth intermediate texture of an upper eyelid with make-up with a fifth intermediate texture of the lower eyelid with make-up; and
generating the second intermediate texture by composing a sixth intermediate texture of the upper eyelid without make-up with a seventh intermediate texture of the lower eyelid without make-up.

10. The method of claim 3, further comprising:
generating a second element-specific texture, wherein the second element-specific texture corresponds to a lip with make-up;
generating a third element-specific texture, wherein the second element-specific texture corresponds to the lip without make-up;
computing a first average color value of the second element-specific texture;
computing a second average color value of the third element-specific texture; and
calculating a difference between the first average color value and the second average color value.

11. The method of claim 10, further comprising, if the difference is less than a threshold:
computing a third average color value based on the first average color value and the second average color value;
wherein the output texture is based on the third average color value.

12. The method of claim 10, further comprising, if the difference exceeds a threshold, computing a quotient map of the second element-specific texture and the third element-specific texture, wherein the output texture comprises the quotient map.

13. The method of claim 12, wherein:
the quotient map comprises an integer quotient map and a fractional quotient map;
the output texture corresponds to one of the integer quotient map and the fractional quotient map;
a second output texture corresponds to another of the integer quotient map and the fractional quotient map; and
generating the effect further comprises applying the output texture and the second output texture to the second input data.

14. The method of claim 3, further comprising:
identifying one or more regions of the element-specific texture that exceeds a pre-defined threshold by applying a threshold mask;
defining a glitter mask that includes one or more default regions; and
generating an augmented glitter mask by adding the one or more identified regions to the glitter mask, wherein the output texture comprises the augmented glitter mask.

15. The method of claim 3, further comprising:
generating a second element-specific texture corresponding to a lip;
identifying one or more regions of the second element-specific texture that corresponds to specular reflections by using a Gaussian blur filter; and
in-painting the identified one or more regions.

16. The method of claim 1, wherein applying the output texture comprises multiplying the second image by the output texture.

17. The method of claim 1, further comprising applying one or more amplifications to the effect, wherein the one or more amplifications comprises one or more of glitter effects, glossiness effects, camera effects, lighting effects, and shading effects.

18. The method of claim 1, wherein the first intermediate texture and the second intermediate texture correspond to one of the eyelid in the open position or the eyelid in the closed position, and wherein the output texture corresponds to one of the eyelid in the open position or the eyelid in the closed position.

19. One or more non-transitory computer-readable storage media embodying software that is operable when executed by a server computing device to:
receive first input data comprising an image of a face with make-up and with an eyelid in an open position, an image of the face without make-up and with the eyelid in the open position, an image of the face with make-up and with the eyelid in a closed position, and an image of the face without make-up and with the eyelid in the closed position;
based on the first input data:
generate a first intermediate texture corresponding to the eyelid of the face with make-up, and
generate a second intermediate texture corresponding to the eyelid without make-up;
generate an output texture based on the first intermediate texture and the second intermediate texture; and
generate an effect by applying the output texture to second input data comprising a second image of a second face.

20. A system comprising:
one or more processors configured to:
receive first input data comprising an image of a face with make-up and with an eyelid in an open position, an image of the face without make-up and with the eyelid in the open position, an image of the face with make-up and with the eyelid in a closed position, and an image of the face without make-up and with the eyelid in the closed position;
based on the first input data:
generate a first intermediate texture corresponding to the eyelid of the face with make-up, and
generate a second intermediate texture corresponding to the eyelid of the face without make-up;
generate an output texture based on the first intermediate texture and the second intermediate texture; and
generate an effect by applying the output texture to second input data comprising a second image of a second face.

* * * * *